(12) United States Patent
Amin et al.

(10) Patent No.: US 7,152,431 B2
(45) Date of Patent: Dec. 26, 2006

(54) REMOVING CONTAMINANTS FROM NATURAL GAS

(75) Inventors: Robert Amin, Bentley (AU); Casper Krijno Groothuis, The Hague (NL)

(73) Assignee: Shell Oil Company, Houston, TX (US)

( * ) Notice: Subject to any disclaimer, the term of this patent is extended or adjusted under 35 U.S.C. 154(b) by 80 days.

(21) Appl. No.: 10/772,621

(22) Filed: Feb. 5, 2004

(65) Prior Publication Data

US 2004/0187686 A1    Sep. 30, 2004

(30) Foreign Application Priority Data

Feb. 7, 2003    (AU) .............................. 2003900534

(51) Int. Cl.
*F25J 3/00* (2006.01)
(52) U.S. Cl. .............................. 62/637; 62/633; 62/629
(58) Field of Classification Search ................. 62/637, 62/618, 620, 621, 632, 633, 62 T
See application file for complete search history.

(56) References Cited

U.S. PATENT DOCUMENTS

| | | | | |
|---|---|---|---|---|
| 2,818,454 A | * | 12/1957 | Wilson ........................ | 585/15 |
| 2,820,833 A | * | 1/1958 | Wilson ........................ | 585/15 |
| 2,943,124 A | * | 6/1960 | Wilson ........................ | 585/15 |
| 3,282,059 A | | 11/1966 | Maher et al. .................. | 62/12 |
| 3,312,621 A | * | 4/1967 | Brownawell et al. ........ | 585/10 |
| 3,355,902 A | | 12/1967 | Crawford et al. ............. | 62/28 |
| 3,537,270 A | * | 11/1970 | Blanchard, Jr. .............. | 62/633 |
| 4,147,456 A | * | 4/1979 | Klass ........................... | 405/210 |
| 4,266,958 A | * | 5/1981 | Cummings ................... | 62/633 |
| 4,793,841 A | | 12/1988 | Burr ............................ | 62/27 |
| 5,520,249 A | | 5/1996 | Minkkinen et al. ......... | 166/266 |
| 5,941,096 A | * | 8/1999 | Gudmundsson .............. | 62/633 |
| 6,111,155 A | * | 8/2000 | Williams et al. ............. | 585/15 |
| 6,224,774 B1 | | 5/2001 | DeSimone et al. .......... | 210/634 |
| 6,539,747 B1 | * | 4/2003 | Minta et al. .................. | 62/620 |
| 2006/0144079 A1 | | 7/2006 | Amin ........................... | 62/532 |

FOREIGN PATENT DOCUMENTS

| | | |
|---|---|---|
| EP | 0665046 | 8/1995 |
| EP | 0665046 A1 | 8/1995 |
| EP | 0665046 B1 | 8/1995 |
| FR | 2824492 | 11/2002 |
| WO | WO9901706 | 1/1999 |
| WO | WO 01/00755 A1 | 1/2001 |
| WO | WO 01/12758 A1 | 2/2001 |
| WO | WO 03/062725 A1 | 7/2003 |

OTHER PUBLICATIONS

PCT International Search Report, International Application No. PCT/EP2004/050077, filed Feb. 4, 2004.
PCT Written Opinion of the International Searching Authority, International Application No. PCT/EP2004/050077, filed Feb. 4, 2004.

* cited by examiner

*Primary Examiner*—William C Doerrler
(74) *Attorney, Agent, or Firm*—William E. Hickman

(57) ABSTRACT

A process for removing contaminants from a natural gas feed stream including water and sour species is provided, which process comprises the steps of cooling the natural gas feed stream in a first vessel (12) to a first operating temperature at which hydrates are formed and removing from the first vessel (12) a stream of dehydrated gas (34); and cooling the dehydrated gas in a second vessel (14) to a second operating temperature at which solids of the sour species are formed or at which the sour species dissolve in a liquid and removing from the second vessel (14) a stream of dehydrated sweetened gas (62).

19 Claims, 2 Drawing Sheets

US 7,152,431 B2

REMOVING CONTAMINANTS FROM NATURAL GAS

FIELD OF THE INVENTION

The present invention relates to a process for removing a contaminant from a natural gas feed stream.

BACKGROUND OF THE INVENTION

Natural gas from either production reservoirs or storage reservoirs typically contains water, as well as other species, which form solids during the liquefaction to produce liquefied natural gas (LNG). It is common practice for the natural gas to be subjected to a dehydration process prior to the liquefaction. Water is removed to prevent hydrate formation occurring in pipelines and heat exchangers upstream of the liquefaction vessel.

If water is not removed, solid hydrates may form in pipework, heat exchangers and/or the liquefaction vessel. The hydrates are stable solids comprising water and natural gas having the outward appearance of ice, with the natural gas stored within the crystal lattice of the hydrate.

The formation of natural gas hydrates was historically seen as an undesirable result that should be avoided. However, processes have been developed to encourage natural gas hydrate formation such as International patent applications No. 01/00 755 and No. 01/12 758. In the first of these International patent applications, a method and apparatus is described whereby natural gas and water are combined in the presence of an agent adapted to reduce the natural gas water interfacial tension to encourage natural gas hydrate formation. In the second of these International patent applications, a production plant is described, including a convoluted flow path to cause mixing of water and natural gas as a first step prior to reducing the temperature to produce natural gas hydrate.

Methods of dehydrating natural gas feed streams include absorption of water in glycol or adsorption of the water using a solid such as hydrated aluminium oxide, silica gels, silica-alumina gels and molecular sieves.

Natural gas also typically contains sour species, such as hydrogen sulphide ($H_2S$) and carbon dioxide ($CO_2$). Such a natural gas is classified as "sour gas". When the $H_2S$ and $CO_2$ have been removed from the natural gas feed stream, the gas is then classified as "sweet". The term "sour gas" is applied to natural gases including $H_2S$ because of the bad odour that is emitted even at low concentrations from an unsweetened gas. $H_2S$ is a contaminant of natural gas that must be removed to satisfy legal requirements, as $H_2S$ and its combustion products of sulphur dioxide and sulphur trioxide are also toxic. Furthermore, $H_2S$ is corrosive to most metals normally associated with gas pipelines so that processing and handling of a sour gas may lead to premature failure of such systems.

Gas sweetening processes typically include adsorption using solid adsorption processes or absorption using amine processes, molecular sieves, etc. Existing dehydration and gas sweetening processes are extremely complex and expensive.

SUMMARY OF THE INVENTION

A process for removing contaminants from a natural gas feed stream containing water is provided comprising the steps of: cooling the natural gas feed stream in a first vessel to a first operating temperature at which hydrates are formed; and removing from the first vessel a stream of dehydrated gas.

DETAILED DESCRIPTION OF THE INVENTION

The present invention represents an improvement on the process and device discussed in International patent application publication No. 03/062 725.

Contaminants from a natural gas feed stream is removed by forming a solid of the contaminant and suitably subsequently melting the solid contaminant.

When the contaminant is water, one embodiment of the present invention relates to a process for dehydrating a natural gas feed stream.

When the contaminant is a sour species, for example hydrogen sulphide or carbon dioxide, one embodiment of the present invention relates to a process for sweetening the natural gas feed stream.

In another embodiment of the present invention relates to a process for sequentially dehydrating and sweetening the natural gas feed stream.

To this end the process for removing contaminants from a natural gas feed stream including water according to the present invention comprises the steps of cooling the natural gas feed stream in a first vessel to a first operating temperature at which hydrates are formed; and removing from the first vessel a stream of dehydrated gas.

An essential feature of the process of the present invention is that on purpose hydrates are formed in order to remove water. Normally formation of hydrates is prevented.

When the natural gas feed stream further includes sour species, the process according to the present invention suitably further comprises the steps of cooling the dehydrated gas in a second vessel to a second operating temperature at which solids of the sour species are formed or at which the sour species dissolve in a liquid; and removing from the second vessel a stream of dehydrated sweetened gas.

The term "operating temperature" is used to refer to a temperature below the solid/liquid transition temperature for the contaminant at a given pressure of operation of the first or second vessel.

In this specification a "warm" liquid stream can be any compatible stream of liquid having a temperature above the solid/liquid transition temperature of the contaminant for a given pressure of operation of the first or second vessel. The warm liquid stream has thus a temperature that is sufficiently high to cause melting of the solids of the contaminant. The warm liquid may or may not take the contaminant fully into solution.

The invention will now be described in more detail with reference to the accompanying drawings.

Figure 1:
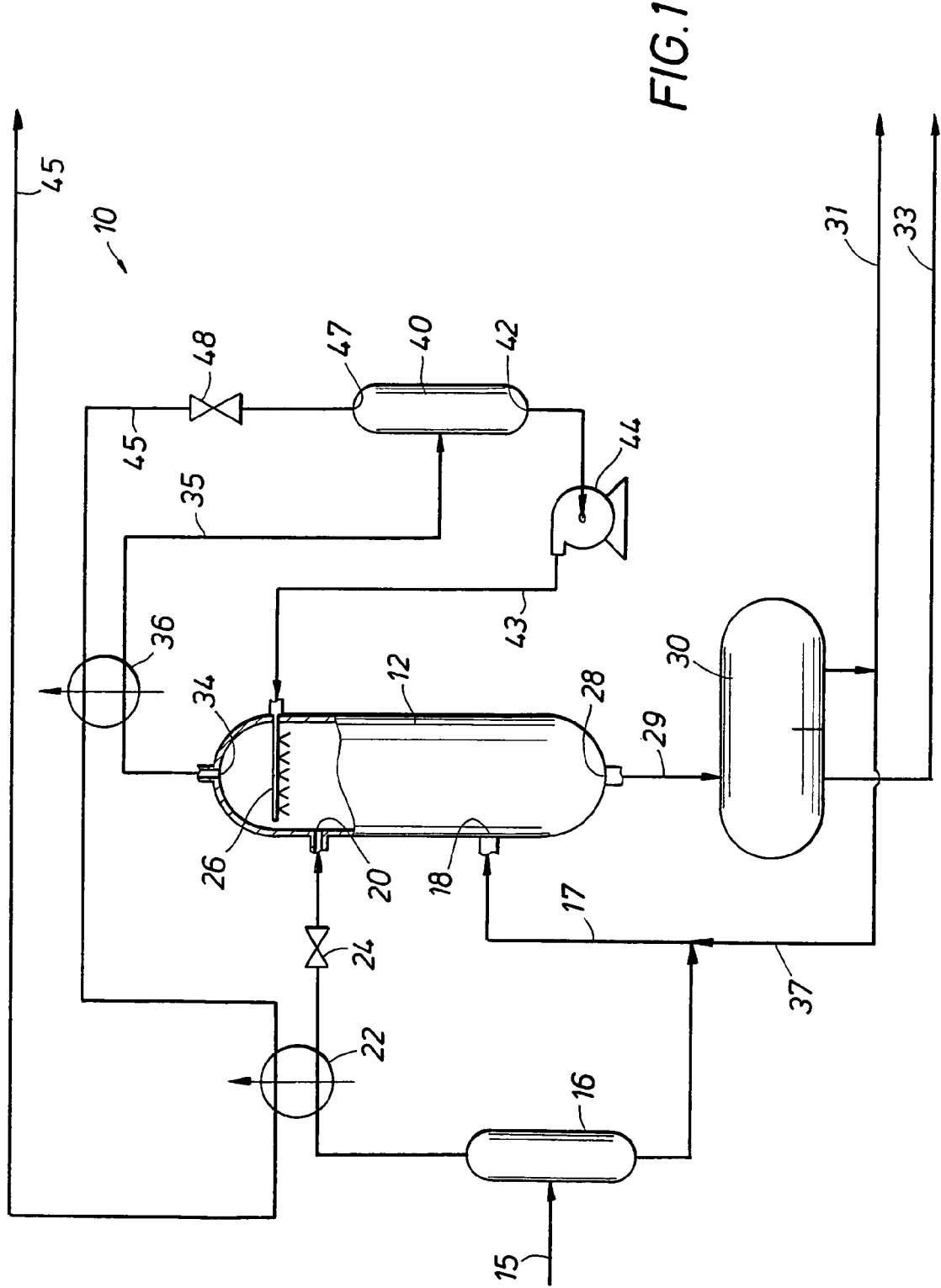
FIG. 1 is a schematic process flow diagram of one embodiment of the invention.

Reference is now made to FIG. 1. FIG. 1 shows an apparatus 10 for carrying out the process of the present invention. The apparatus 10 comprises a first vessel 12. The contaminant removed in the first vessel 12 is water and thus the gas exiting the first vessel 12 is dry. Also heavy hydrocarbons are removed as a consequence of this process, and thus the gas stream exiting the first vessel 12 is dew pointed for hydrocarbons to an extent determined by the conditions in the first vessel 12. The water dew point of the gas exiting the first vessel 12, however, is lower than its equilibrium dew point due to the formation of hydrates.

In the embodiment as illustrated in FIG. 1, wet feed gas from a wellhead is fed through conduit 15 to a first flash tank 16 in which condensate is separated from the feed gas. The pressure and temperature conditions within the first flash tank 16 would typically be in the order of 75 to 130 bar and between 25 and 40° C. (about 5 to 10° C. above the hydrate formation temperature). The condensate liquid stream exiting the first flash vessel 16 through conduit 17 is "a warm liquid" as defined above. The condensate consists of liquid hydrocarbons that are produced together with natural gas. The gas stream separated from the sour wet feed gas in the first flash tank 16 enters the first vessel 12 via wet sour gas feed stream inlet 20. An intermediate heat exchanger 22 may be used to cool the wet sour gas between the first flash tank 16 and the first vessel 12. The intermediate heat exchanger 22 drops the temperature of the wet sour gas to a temperature just above the hydrate formation temperature for the particular pressure of this feed stream. The hydrate formation temperature for the particular pressure of the feed stream is the maximum value of the first operating temperature, which is the operating temperature in the first vessel 12.

The wet gas feed stream fed to the first vessel 12 is expanded using a Joule-Thompson valve 24 or other suitable expansion means such as a turbo expander to further cool the stream as it enters the first vessel 12. The Joule-Thompson valve 24 may alternatively define the inlet 20 to the first vessel 12. Upon expansion of the wet sour gas feed stream into the first vessel 12, the gas pressure-temperature conditions within the vessel 12 allow hydrates to form. The necessary degree of cooling is achieved by the degree of expansion of the wet sour gas feed stream through the Joule-Thompson valve 24.

The first operating temperature and the pressure in the first vessel 12 are maintained at a level whereby hydrates are formed. The natural gas feed stream entering downstream of the Joule-Thompson valve 24 into the first vessel 12 is at the first operating temperature.

If the natural gas feed stream also contains sour species, the first operating temperature to which the feed gas in the first vessel 12 is cooled is below the temperature at which hydrates are formed but above the temperature at which solids of sour species, such as $H_2S$ and $CO_2$, are formed. This is done to produce hydrates and to prevent the formation of solids of sour species in the first vessel 12.

Dry sour gas exits the first vessel 12 via dry sour gas outlet 34. Typically the dry sour gas exiting the first vessel 12 would have a nominal pressure of 10 to 30 bar lower than the pressure upstream of the expansion device 24 and a temperature of 10 to 25° C. lower than the temperature just upstream of the expansion device 24. The term "dry gas" is used to refer to water-free gas.

A hydrate-containing liquid stream is removed from the first vessel 12 via water condensate outlet 28, and passed through conduit 29 to a separator 30. The water is separated from the condensate in the water condensate separator 30. Such a separator is for example a baffled gravity separation unit. As water is heavier than the condensate, any suitable gravity separation techniques may be used. The separated condensate is removed through conduit 31 and the separated water is removed through conduit 33.

The natural gas feed stream entering into the first vessel 12 was cooled to the first operating temperature. Alternatively, the natural gas feed stream can be cooled using one or more sprays of a sub-cooled liquid introduced via sub-cooled liquid inlet 26. In a further alternative embodiment, the natural gas feed stream is cooled by both the Joule-Thompson valve 24 and the sub-cooled liquid supplied through inlet 26. In case of spray cooling, the natural gas feed stream can enter into the first vessel 12 at a temperature that is at or above the hydrate-formation temperature.

The sub-cooled liquid inlet 26 should be located in the first vessel 12 above the inlet 20 of the wet sour gas feed stream. In the illustrated embodiment, the sub-cooled liquid inlet 26 is a plurality of spray nozzles. The particular sub-cooled liquid is condensate recycled from the process and sprayed into the first vessel 12. Sprays are used in order to maximise the contact area of the sub-cooled liquid and the gas and thus the cooling effect of contact of the sub-cooled liquid with the wet-sour gas.

The dry sour gas at a pressure of 10 to 30 bar lower than the pressure upstream of the expansion device 24 and at the operating temperature of the first vessel 12 is directed via second heat exchanger 36 in conduit 35 to a second flash tank 40. It is cooled in the second heat exchanger 36 to form a two-phase mixture of gas and condensate at a temperature higher than 56° C. Not shown is that additional cooling may be provided by indirect heat exchange with a refrigerant that is circulated through an external refrigeration cycle, for example a propane refrigeration cycle. In the second flash tank 40, condensate is separated from the dry sour gas stream. The liquid stream exits the second flash tank 40 via liquid outlet 42 and is sufficiently cooled to satisfy the criteria of a sub-cooled liquid that may be fed to the sub-cooled liquid inlet 26 of the first vessel 12. The sub-cooled liquid is supplied through conduit 43, provided with a pump 44 to the sub-cooled liquid inlet 26.

The dry sour gas exits the second flash tank 40 via gas outlet 47 and is fed through conduit 45 to the intermediate heat exchanger 22 and from there to an end user (not shown). Conduit 45 may comprise a Joule-Thompson valve 48.

As observed earlier, the present invention relates to dehydrating natural gas by forming hydrates. To prevent hydrates from blocking outlet 28 and conduit 29, the condensate present in the lower portion of the first vessel 12 is preferably heated. This is suitably done by introducing a warm liquid into the first vessel 12 below the level at which the feed stream is introduced.

A portion of the stream of warm condensate separated in the first flash tank 16 is fed through conduit 17 and inlet 18 to the first vessel 12. The warm condensate is sufficiently warm to liquefy hydrate formed in the first region of the first vessel 12. As the hydrates melt, the gas trapped in the hydrate lattice is liberated and the water goes into solution with the condensate. In addition at least a portion of the condensate separated in the water/condensate separator 30 can be recycled for use as the warm liquid used for heating the solids of the freezable species in the first vessel 12 through conduit 37 (after heating, not shown).

Any gas present within the water condensate separator may be recycled to the first vessel 12. Alternatively or additionally, a portion of the gas separated in the water/condensate separator 30 may be recycled to the wet sour gas feed stream entering the first vessel 12 via inlet 20.

Suitably the liquid that is sprayed into the first vessel through inlets 26 is a natural gas liquid, which natural gas liquid is a mixture of $C_2$, liquefied petroleum gas components, $C_3$ and $C_4$ and $C_5$+ hydrocarbon components.

Suitably, the warm liquid that is introduced into the first vessel through inlet 18 is also a natural gas liquid.

Figure 2:
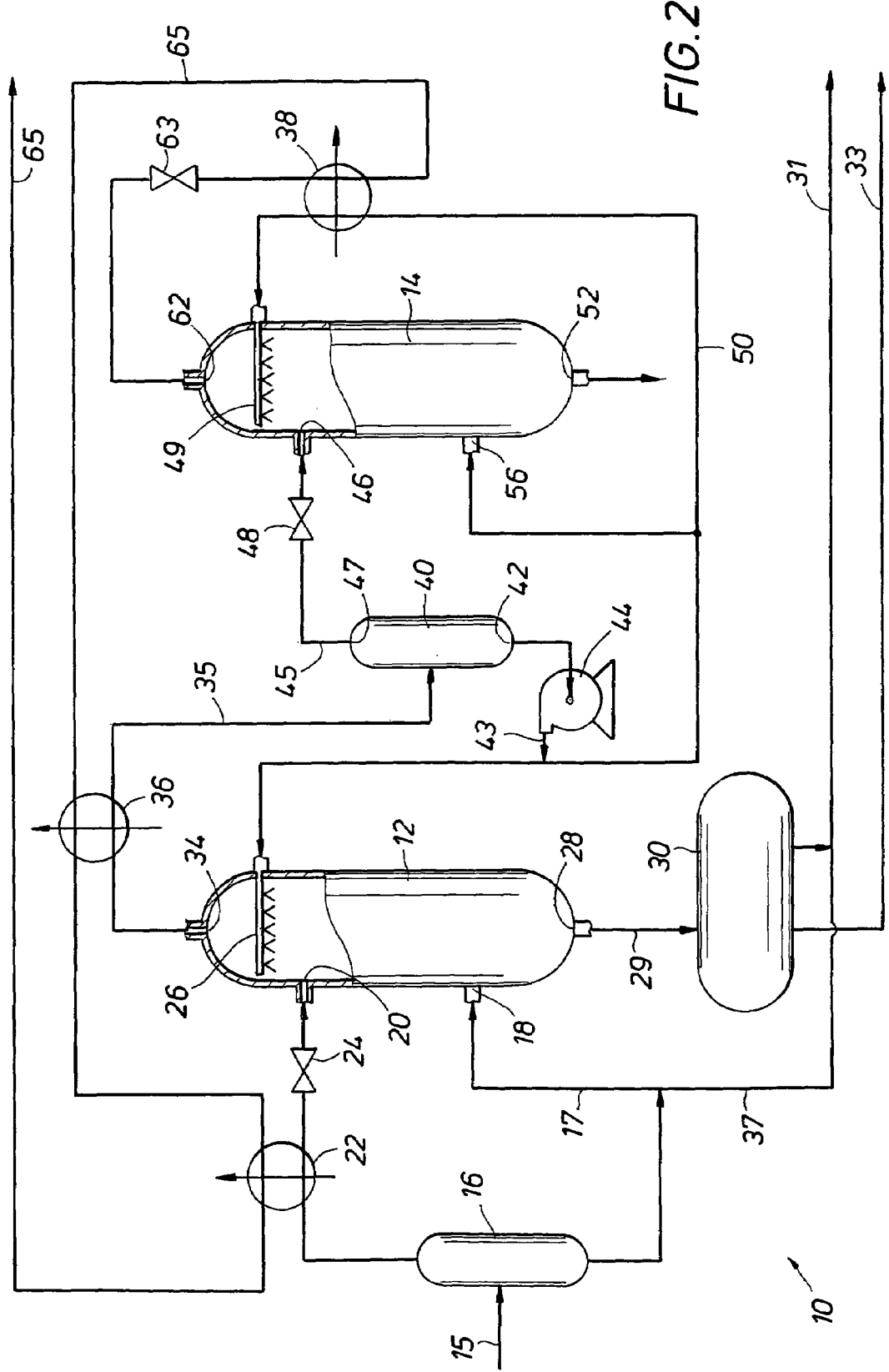
FIG. 2 is a schematic process flow diagram of a further embodiment of the invention.

Reference is now made to FIG. 2 showing a further embodiment of the present invention. In this further embodiment dehydrated gas is treated to remove sour components from it. The dehydration process is discussed with reference to FIG. 1, and will not be repeated here. Parts having the same function as parts shown in FIG. 1 get the same reference numeral.

The dry sour gas exits the second flash tank 40 via gas outlet 42 and is fed to a second vessel 14 via dry sour gas inlet 46. As with the first vessel 12, the dry sour gas being fed to the second vessel 14 may be expanded through a Joule-Thompson valve 48 or other suitable expansion means, such as a turbo expander, in order to further cool the gas. As before with the first vessel 12, the Joule-Thompson valve may define the dry sour gas inlet 46. The temperature of the dry gas entering into the second vessel 14 is at a second operating temperature. The second operating temperature is the maximum temperature at which solids of the sour species are formed or the temperature at which the sour species dissolve in a liquid.

The gas exiting the second vessel 14 via outlet 62 is dehydrated and sweetened. The dry sweetened gas would typically be at a pressure of between 20 and 50 bar and a temperature of not lower than −85° C. This product stream of sweetened dry gas is typically transported to the end user at ambient temperature.

The product stream of dry sweetened gas can be further cooled by allowing the gas to expand in expansion device 63, and the further cooled dry sweetened gas is used in one or more of the heat exchangers 38, 36 or 22 to effect cooling of one or more of the other process streams within the apparatus 10. Please note that the temperature to which the dry gas is cooled in heat exchanger 36 is greater than that at which the solids of the sour species form for the given line pressure.

Through outlet 52 a liquid is removed that contains the sour species.

The dry sour gas was cooled to the second operating temperature by allowing the gas to expand in Joule-Thompson valve 48. Alternatively, the dry sour gas can be cooled using one or more sprays of a sub-cooled liquid supplied through inlet 49. In a further alternative embodiment, the natural gas feed stream is cooled by both the Joule-Thompson valve 48 and the sub-cooled liquid supplied through inlet 49. In case of spray cooling, the dry gas can enter into the second vessel 14 at a temperature that is at or above the temperature at which solids of the sour species are formed or the temperature at which the sour species dissolve in a liquid.

The sub-cooled liquid inlet 49 should be located in the second vessel 14 above the dry sour gas inlet 46. In the illustrated embodiment the sub-cooled liquid inlet 49 is a plurality of spray nozzles. The temperature and pressure conditions in the second vessel 14 are adjusted so as to form solids of the freezable species. For sweetening of a gas, the temperature-pressure conditions need only be adjusted to form solids of hydrogen sulphide ($H_2S$) and carbon dioxide ($CO_2$). However, the process conditions within the second vessel are sufficient to cause the formation of solids of the freezable species of other hydrocarbons such as benzene, toluene, ethylbenzene and xylene.

Suitably, the sub-cooled liquid is part of the liquid passing through conduit 43. In order to reduce the temperature the liquid is passed through conduit 50 to the heat exchanger 38 where it is cooled by indirect heat exchange with dry sweetened gas. The dry sweetened gas is then passed through conduit 65 to heat exchanger 36 for cooling the dry sour gas from the first vessel 12. The dry sweetened gas is then fed to the intermediate heat exchanger 22 and from there to an end user (not shown).

Applicant had found that in particular the concentration of $C_2$–$C_4$ hydrocarbon components in the liquid should be in the range of from 0.5 to 1.5 mol per mol of $CO_2$ in the feed gas. The liquid in the second vessel 14 is the liquid sprayed in the vessel through the inlet 49. Thus the concentration of $C_2$–$C_4$ hydrocarbon components in the sub-cooled liquid should be in the specified range. It will be understood that if the concentration of $C_2$–$C_4$ hydrocarbon components in the liquid stream in conduit 50 is too low, additional $C_2$–$C_4$ hydrocarbon components can be added to this stream.

To prevent sour species from blocking outlet 52, the condensate present in the lower portion of the second vessel 14 is preferably heated. This is suitably done by introducing a warm liquid through warm condensate inlet 56 into the second vessel 14 below the level at which the feed stream is introduced. A suitable liquid is liquid passing through conduit 50. Alternatively liquid passing through conduit 31 can be used.

Further optimisation of the above discussed flow schemes to improve heat integration is possible. For example part of the hydrocarbon liquid stream leaving the second vessel 14 through outlet 52 can be recycled to inlet 26 of the first vessel 12. In order to do so a separation vessel (not shown) is used to separate a stream of liquid enriched in sour species from the hydrocarbon stream that is recycled.

We claim:

1. A process for removing contaminants from a natural gas feed stream containing water and a sour species comprising:
   dehydrating the natural gas feed stream in a first vessel;
   removing from the first vessel a stream of dehydrated gas;
   cooling the dehydrated gas in a second vessel to a second operating temperature at which solids of the sour species are formed or at which the sour species dissolve in a liquid;
   removing from the second vessel a stream of dehydrated sweetened gas;
   wherein dehydrating the natural gas feed stream comprises cooling the natural gas feed stream in the first vessel to a first operating temperature to form hydrates; and
   wherein cooling the natural gas feed stream comprises introducing the natural gas feed stream and a stream of liquid into the first vessel at a temperature that is below the first operating temperature to form a slurry with the hydrates.

2. A process for removing contaminants from a natural gas feed stream containing water and a sour species comprising:
   dehydrating the natural gas feed stream in a first vessel;
   removing from the first vessel a stream of dehydrated gas;
   cooling the dehydrated gas in a second vessel to a second operating temperature at which solids of the sour species are formed or at which the sour species dissolve in a liquid;
   removing from the second vessel a stream of dehydrated sweetened gas;
   wherein cooling the dehydrated gas comprises introducing the dehydrated gas and a stream of liquid into the second vessel at a temperature that is below the second operating temperature to form a slurry or mixture with the sour contaminants.

3. The process of claim 2 wherein dehydrating the natural gas feed stream comprises cooling the natural gas feed stream to a first operating temperature at which hydrates are formed, wherein cooling the natural gas feed stream comprises introducing the natural gas feed stream into the first vessel at a temperature that is below the first operating temperature.

4. The process of claim 1 wherein cooling the dehydrated gas comprises introducing the dehydrated gas and a stream of liquid into the second vessel at a temperature that is below the second operating temperature to form a slurry or mixture with the sour contaminants.

5. The process of claim 1 wherein the liquid is a natural gas liquid.

6. The process of claim 2 wherein the liquid is a natural gas liquid.

7. The process of claim 3 wherein the liquid is a natural gas liquid.

8. The process of claim 4 wherein the liquid is a natural gas liquid.

9. A process for removinu contaminants from a natural gas feed stream containing water and a sour species comprising:
dehydrating the natural gas feed stream in a first vessel;
removing from the first vessel a stream of dehydrated gas;
cooling the dehydrated gas in a second vessel to a second operating temperature at which solids of the sour species are formed or at which the sour species dissolve in a liquid;
removing from the second vessel a stream of dehydrated sweetened gas;
wherein dehydrating the natural gas feed stream comprises cooling the natural gas feed stream in the first vessel to a first operating temperature to form hydrates; and
further comprising heating the hydrates in the first vessel to a temperature that is above the first operating temperature thereby producing a water-containing liquid.

10. A process for removing contaminants from a natural gas feed stream containing water and a sour species comprising:
dehydrating the natural gas feed stream in a first vessel;
removing from the first vessel a stream of dehydrated gas;
cooling the dehydrated gas in a second vessel to a second operating temperature at which solids of the sour species are formed or at which the sour species dissolve in a liquid;
removing from the second vessel a stream of dehydrated sweetened gas; and
further comprising heating the sour species in the second vessel to a temperature that is above the second operating temperature thereby producing a sour species-containing liquid.

11. The process of claim 9 further comprising heating the sour species in the second vessel thereby producing a sour species-containing liquid.

12. The process of claim 9 wherein heating the hydrates in the first vessel comprises adding to the hydrates a warm liquid.

13. The process of claim 11 wherein heating the hydrates in the first vessel comprises adding to the hydrates a warm liquid.

14. The process of claim 10 wherein heating the sour species in the second vessel comprises adding to the sour species a warm liquid.

15. The process of claim 11 wherein heating the sour species in the second vessel comprises adding to the sour species a warm liquid.

16. The process of claim 12 wherein the warm liquid is a natural gas liquid.

17. The process of claim 13 wherein the warm liquid is a natural gas liquid.

18. The process of claim 14 wherein the warm liquid is a natural gas liquid.

19. The process of claim 15 wherein the warm liquid is a natural gas liquid.

* * * * *